Patented Jan. 31, 1933

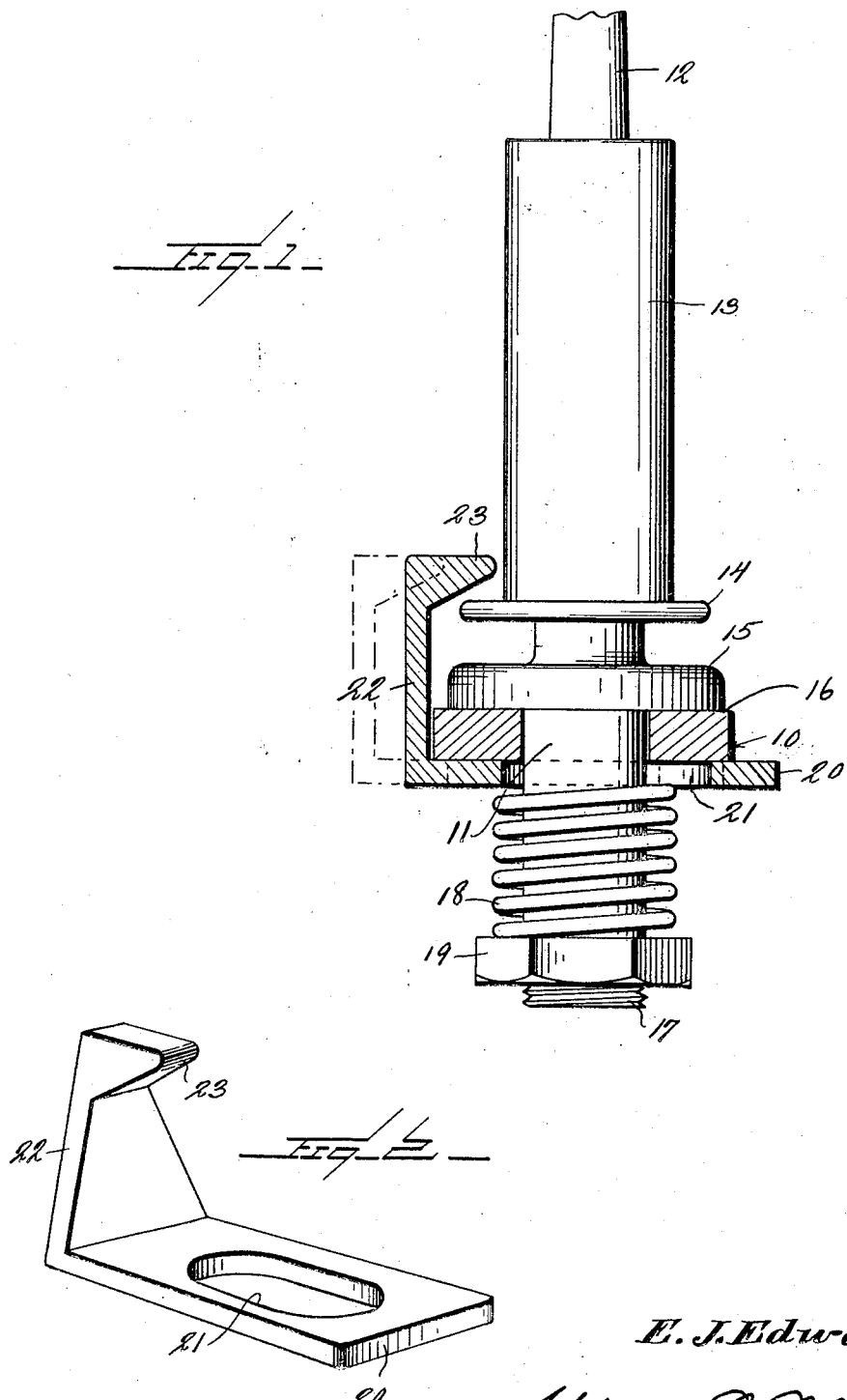

1,895,707

UNITED STATES PATENT OFFICE

ELLIS J. EDWARDS, OF SCRANTON, PENNSYLVANIA

BOBBIN SPINDLE LOCK

Application filed February 2, 1932. Serial No. 590,446.

This invention relates to spindles and more particularly to means for removably mounting the spindle on the operating member.

An object of this invention is to provide a releasable locking means which can be mounted on any conventional spindle and support therefor so as to permit the ready release of the spindle.

The above and various other objects and advantages of this invention will in part be described in and in part be understood from the following detailed description of the present preferred embodiment, the same being illustrated in the accompanying drawing, wherein:—

Figure 1 is a detail side elevation of a spindle and spindle support having a device constructed according to the preferred embodiment of this invention mounted thereon, the device being shown in section;

Figure 2 is a detail perspective view of the device removed from the spindle support.

Referring to the drawing wherein like numerals of reference designate corresponding parts throughout the several views, the numeral 10 designates generally a support which may be in the form of an elongated rail mounted on a machine or a portion of a bobbin swing, and the numeral 11 designates a shank having a spindle 12 mounted thereon. This spindle 12 is provided with a tubular lower end portion 13 terminating in an annular flange 14 which is disposed upwardly from a ring-shaped member 15 engaging about the shank 11 and engaging the upper surface of the supporting member 10. The surface of the member 15 may contact with the upper surface of the support 10 as at 16. The lower end of the shank 11 is provided with a threaded portion 17 and a spring 18 is disposed about the shank 11 below the support 10 and is held in tensioned relation by means of a tensioning nut 19.

In order to provide means whereby the spindle 12 having the sleeve 13 and the flange 14 formed therewith may be releasably mounted on the shank 11, I have provided a releasable locking member comprising a plate 20 having an elongated slot 21 extending longitudinally thereof and within which the shank 11 is loosely received. This plate 20 is adapted to have movement transversely of the longitudinal axis of the shank 11 and the axis of the spindle 12 and is provided at one end with an extension 22 extending in a direction parallel to the longitudinal axis of the shank 11, and this extension 22 terminates in an upwardly extending lug or locking member 23 which is adapted to be disposed upwardly from the flange 14. The lower face of this plate 20 contacts with the upper end of the spring 18, being interposed between the spring 18 and the lower surface of the support 10.

In the use of this device, the locking member herein disclosed will be normally maintained in locking position by means of the spring 18, the extension 22 being disposed closely adjacent the support 10 with the locking lug 23 positioned upwardly of the flange 14 so as to prevent upward movement of the spindle 12. When it is desired to remove the spindle 12, the plate 20 is moved transversely of the axis of the shank 11 so as to move the locking lug 23 to a position permitting the upward movement of the spindle 12 without the flange 14 contacting with the locking lug 23.

It is obvious from the foregoing that a relatively simple and at the same time practical locking means has been disclosed for various types of spindles on various types of machines which can be mounted on the spindle supports without undue change in the characteristics of the supports. If desired, the locking means may be readily stamped out of a single piece of metal with the extension 22 and the lug 23 integrally formed with the plate 20.

It is, of course, understood that various changes and modifications may be made in the details of construction and design of the above specifically described embodiment of this invention without departing from the spirit thereof, such changes and modifications being restricted only by the scope of the following claim.

What is claimed is:—

In a flanged spindle and a support therefor, a lock for releasably locking the spindle on the support comprising a horizontally disposed plate having an elongated slot to loosely receive that portion of the spindle below the support, the upper face of the plate slidably engaging the support, a vertical extension integral with the plate and extending above the flanged portion of the spindle, and a lug integral with the extension and extending in the direction of the spindle, said lug having an upwardly and inwardly inclined lower face portion, engagement of the flange with the lower face of the lug upon upward movement of the spindle forcibly moving the lug and plate laterally into released position.

In testimony whereof I hereunto affix my signature.

ELLIS J. EDWARDS.